United States Patent
Naas et al.

(10) Patent No.: US 10,429,684 B2
(45) Date of Patent: *Oct. 1, 2019

(54) DISPLAY TILE WITH INCREASED DISPLAY AREA

(71) Applicant: BARCO N.V., Kortrijk (BE)

(72) Inventors: Nico Naas, Karlsruhe (DE); Tom Adriaan Gerard Dewaele, Kruishoutem (BE)

(73) Assignee: BARCO N.V., Kortrijk (BE)

( * ) Notice: Subject to any disclaimer, the term of this patent is extended or adjusted under 35 U.S.C. 154(b) by 0 days.

This patent is subject to a terminal disclaimer.

(21) Appl. No.: 16/129,906

(22) Filed: Sep. 13, 2018

(65) Prior Publication Data

US 2019/0011749 A1    Jan. 10, 2019

Related U.S. Application Data

(63) Continuation of application No. 15/510,734, filed as application No. PCT/EP2015/070974 on Sep. 14, 2015, now Pat. No. 10,108,038.

(30) Foreign Application Priority Data

Sep. 15, 2014   (GB) .................................. 1416248.1
Sep. 15, 2014   (GB) .................................... 1416277
Sep. 4, 2015    (TW) ................................ 104129319

(51) Int. Cl.
*G02F 1/1333*  (2006.01)

(52) U.S. Cl.
CPC .... *G02F 1/13336* (2013.01); *G02F 1/133308* (2013.01); *G02F 2001/133328* (2013.01); *G02F 2201/46* (2013.01); *G02F 2202/28* (2013.01)

(58) Field of Classification Search
CPC ........... G02F 1/13336; G02F 1/133308; G02F 2001/133328

See application file for complete search history.

(56) References Cited

U.S. PATENT DOCUMENTS 5,867,236 A * 2/1999 Babuka ................. G02F 1/1339
                                                      349/73
5,995,179 A * 11/1999 Tamura ................. G09F 9/3026
                                                      349/58

(Continued)

FOREIGN PATENT DOCUMENTS

CN       102654660 A    9/2012
DE    202009015262 U1   3/2010

(Continued)

OTHER PUBLICATIONS

International Search Report (ISR) dated Nov. 27, 2015, for PCT/EP2015/070974.

(Continued)

*Primary Examiner* — Nidhi Thaker
(74) *Attorney, Agent, or Firm* — Bacon & Thomas, PLLC

(57) ABSTRACT

A display tile having a frame whose compliance is increased in a well determined region to accommodate the different thermal expansions of the frame and one or more substrates to which the frame is fastened. The display tile has also regions of increased compliance that will deform to allow different parts of the frame to be brought into contact and glued to the lateral sides of two superimposed substrates when at least one lateral side of one of the substrates is not coplanar with the corresponding lateral side of the other substrate.

20 Claims, 6 Drawing Sheets

(56) References Cited

U.S. PATENT DOCUMENTS

| | | | |
|---|---|---|---|
| 8,446,540 B2 | 5/2013 | Lee | |
| 2007/0223697 A1 | 9/2007 | Mizuno | |
| 2011/0181937 A1 | 7/2011 | Miyashita | |
| 2011/0221995 A1* | 9/2011 | Park | G02F 1/13336 349/58 |
| 2014/0120275 A1 | 5/2014 | Lu et al. | |
| 2015/0138484 A1* | 5/2015 | Watanabe | G02F 1/133308 349/58 |
| 2015/0169277 A1* | 6/2015 | Kim | G06F 3/1446 345/1.3 |
| 2016/0062163 A1* | 3/2016 | Lee | G02F 1/13336 359/599 |
| 2016/0062523 A1* | 3/2016 | Jeong | G02F 1/133308 349/12 |
| 2016/0366379 A1* | 12/2016 | Hickl | G02B 3/08 |

FOREIGN PATENT DOCUMENTS

| | | |
|---|---|---|
| JP | 06140727 | 5/1994 |
| JP | 2004152984 A | 5/2004 |
| JP | 2010117638 A | 5/2010 |
| JP | 2011047880 A | 3/2011 |
| KR | 1020060007981 | 1/2006 |
| TW | 200604969 | 4/1994 |
| TW | M519795 U | 4/2016 |
| WO | 0075912 A2 | 12/2000 |
| WO | 2013172423 A1 | 11/2013 |
| WO | 2015128408 A1 | 9/2015 |

OTHER PUBLICATIONS

Written Opinion dated Nov. 27, 2015, for PCT/EP2015/070974.
Second Written Opinion dated Sep. 16, 2016, for PCT/EP2015/070974.
International Preliminary Report on Patentability dated Dec. 22, 2016, for PCT/EP2015/070974.
British Search Report dated Mar. 16, 2015, for GB 1416277.0.
British Search Report dated Oct. 9, 2015, for GB 1416277.0.
Extended European Search Report in European Patent Application No. 17207863.6-1210, dated Feb. 19, 2018.
Office Action in TW Application No. 104129319, dated Dec. 12, 2018.
TW Office Action in corresponding TW Application No. 104129319, dated Mar. 29, 2019.
Japanese Office Action in corresponding Japanese Application No. 2017-514500, dated Jun. 18, 2019.

* cited by examiner

DISPLAY TILE WITH INCREASED DISPLAY AREA

The present invention relates to a frame for a display or display tile, a display or display tile itself, or a method of constructing such a frame for a display or display tile.

BACKGROUND OF THE INVENTION

FIG. 1 shows a schematic representation of a tiled display.

The display tiles T can be an emissive display apparatus like e.g. a Liquid Crystal Display apparatus or it can be a rear projection display apparatus.

FIG. 1 also shows schematically how the picture elements or pixels P are arranged on the display tile T. Three sub-pixels green, red and blue lie close to one another and produce in their totality a picture element of the image displayed. The picture elements follow one another with a spacing A. The broken line indicates the inner area of the display tile T on which an image can be formed and viewed by a viewer. The space between the broken line and the edges of a display tile T is a non-display area. The non-display area often corresponds to a space occupied by a bezel B whose primary function is to hold the LCD panel of the LCD in position. In the prior art the spacing between two adjacent picture elements P displayed onto adjacent display tiles T is largely determined by the distance separating two adjacent display tiles T and the width of the bezel B. The space between the display areas of two adjacent display tiles is often referred to as the seam (SEAM). The minimum distance between two adjacent display tiles T depends on the clearance needed to allow thermal and humidity expansion of the display tiles T without misalignment, bowing or damaging of the Liquid Crystal panel (or projection screen) of the display tile T.

The problem of thermal and humidity expansion and the relative movement of tiles with respect to each other and its impact on the inter-tile seams is well known in the art too.

The width of the bezel can be decreased or the bezel can be eliminated as e.g. proposed in U.S. Pat. No. 8,446,540 "Display device having an enlarged display area".

The problem is that the solution may not be reliable for large liquid crystal panels (e.g. with more than one meter of diagonal) as the weight of the panel could overcome the forces exerted by the "fixing member" and "panel guide portion".

Another problem is that the panel guide portion may not be in metal to avoid scratching the liquid crystal panel. Therefore, it needs to be thick enough to withstand the forces applied on it. The seam will thus be at least twice as wide as the panel guide portion will be thick.

The author of U.S. Pat. No. 8,446,540 also excludes the use of adhesive tape to fasten the liquid crystal panel to a frame because it is incompatible with reliability and durability of the assembly.

The reliability and durability could be improved if the adhesive tape were thick enough.

For instance, with values of $\alpha$-aluminum=$23.8 \cdot 10^{-6}$ 1/K and $\alpha$-glass=$8.1 \cdot 10^{-6}$ 1/K ($\alpha$ being the coefficient of thermal expansion) and a total bond length at room temperature of $L0=1500$ mm for a change in temperature of $\Delta T=40$ K a difference in length at both ends of $\Delta L = \Delta T \cdot L0/2 \cdot (\alpha\text{-Al}-\alpha\text{-Glass}) = 0,471$ mm will occur in a stress-free assembly (i.e. when aluminum and metal are not bonded together). A pressure sensitive mounting tape with a thickness of 0.8 mm should be suitable to compensate $\Delta\alpha$-induced stress in this configuration.

But such a thickness of pressure sensitive mounting tape is not compatible with a seam of less than 1 mm.

The art also does not provide solutions for reliably fastening a liquid crystal panel affected by tolerances (e.g. a mismatch between the lateral dimensions of the glass panel delimiting the liquid crystal layer) while at the same time avoiding the use of a bezel or rim.

There is a need to improve the art.

SUMMARY OF THE INVENTION

It is an object of the present invention to provide a frame for a display or display tile, a display or display tile itself, or a method of constructing such a frame for a display or display tile.

A frame for a display or display tile, a display or display tile itself, or a method of constructing such a frame for a display or display tile according to embodiments of the present invention may overcome one or more of the disadvantages mentioned above.

According to an aspect of the present invention, a display tile comprises a frame made of a first material with a first coefficient of thermal expansion fastened to a substrate made of a second material with a second coefficient of thermal expansion by means of a heat activated adhesive tape; the frame being characterized in that it is divided into three parts: a first part to be glued to a lateral side of the substrate, a third part to serve as fastening interface to another structure like e.g. a backlight element or a support structure and a second part positioned between the first and third part to isolate the third part from strain in the first part e.g. as strain relief.

Isolating the first part of the frame that is heated when the adhesive tape is activated from the third part of the frame that remains at a lower temperature than that of the first part prevents excessive deformation of the substrate once fastening of the frame to the substrate is complete.

In particular, the first coefficient of thermal expansion is preferably higher than the second coefficient of thermal expansion.

In particular, the first material is preferably a metal with a coefficient of thermal expansion larger or equal to 23.8 10−6 1/K. The metal can be aluminum, for example.

In particular the second material is preferably glass with a coefficient of thermal expansion. The glass can be, for example, a borosilicate glass with a coefficient of thermal expansion lower or equal to $9.5 \cdot 10^{-6}$ 1/K.

In a further aspect of the invention the frame is divided into two or more frame elements or frame strips. Each frame strip has a first part to be glued to a lateral side of the substrate, a third part to serve as fastening interface to another structure like e.g. a backlight element or a support structure and a second part positioned between the first and third part to isolate the third part from strain in the first part, e.g. to operate as strain relief.

Isolating the third part of the frame strip from strain in the first part of the frame strip can be assured by one or more openings in the frame strip. The opening extends across the first and second part of the frame strip away from the substrate.

The openings can for instance be rectangular. The corners of the rectangle can be rounded.

In another aspect of the invention, the third part of the (frame) strip is preferably isolated from strain in the first part of the frame strip by grooves formed, for example by etching or stamping in the frame part or by any equivalent method.

The grooves can be formed on both sides of the frame strip. The depth of the grooves is preferably more than half the thickness of the frame strip in the first and second part of the frame strip.

In a further aspect of the invention, a display tile comprises a frame fastened to a first substrate and a second substrate by means of an adhesive tape; the frame being characterized in that it is divided into 3 parts: a first part to be glued by means of the adhesive tape (e.g. a heat activated adhesive tape) to a lateral side of the first substrate, a third part to be glued by means of the adhesive tape (e.g. a heat activated adhesive tape) to a lateral side of the second substrate and a second part positioned between the first and third part, the second part having higher compliance than the first and third part thereby allowing the first and third part to be positioned in different planes.

In another aspect a method of fabricating a frame for a display tile is provided, the frame being made of a first material with a first coefficient of thermal expansion, the method comprising:

fastening the frame to a substrate made of a second material with a second coefficient of thermal expansion by means of a heat activated adhesive tape;

fabricating the frame in three parts:

gluing a first part by means of the heat activated adhesive tape to a lateral side of the substrate, fastening a third part to another structure and positioning a second part between the first and third part to isolate the third part from strain in the first part.

In another aspect a method of fabricating a frame for a display tile is provided, the method comprising:

fastening the frame to a first substrate and a second substrate by means of an adhesive tape;

fabricating the frame in 3 parts:

gluing a first part by means of a heat activated adhesive tape to a lateral side of the first substrate, gluing a third part by means of the heat activated adhesive tape to a lateral side of the second substrate, and positioning a second part between the first and third part, the second part having a higher compliance than the first and third part thereby allowing the first and third part to be positioned in different planes.

It is an advantage of that aspect of the invention that it allows a frame to be glued to a first substrate and a second substrate, the first substrate being parallel to the second substrates even when at least one lateral side of the first substrate is not coplanar with the corresponding lateral side of the second substrate.

In a further aspect of the invention grooves are formed in the second part of the frame; the grooves being substantially parallel to the first and second substrates.

The grooves will increase the compliance of the frame in the desired direction and will allow different parts of the frame to be in different planes.

In a further aspect of the invention the grooves are formed on both sides of the frame.

In a further aspect of the invention the depth of the grooves is at least 50% of the thickness of the frame.

In another aspect the invention proposes a frame for a display tile, the frame being made of a first material with a first coefficient of thermal expansion and being fastened to a substrate made of a second material with a second coefficient of thermal expansion by means of a heat activated adhesive tape; the frame being divided into three parts: a first part to be glued by means of the heat activated adhesive tape to a lateral side of the substrate, a third part to serve as fastening interface to another structure and a second part positioned between the first and third part to isolate the third part from strain in the first part. In a further aspect at least one opening extends from an edge of the frame and extends across the first part and second part of the frame. In a further aspect grooves are formed in the first part and/or the second part of the frame. The grooves may be formed on both sides of the frame. The depth of the grooves may be at least 50% of the thickness (x) of the frame. In a further aspect the frame is split into two or more frame elements or strips. Any or every feature relating to the frame can relate to one or more of the frame elements or strips. According to a further aspect said another structure is a backlight element or a support structure.

In another aspect the invention proposes a frame for a display tile, the frame being fastened to a first substrate and a second substrate by means of an adhesive tape; the frame being divided into parts: a first part to be glued by means of the adhesive tape to a lateral side of the first substrate, a third part to be glued by means of the adhesive tape to a lateral side of the second substrate and a second part positioned between the first and third part, the second part having a higher compliance than the first and third part thereby allowing the first and third part to be positioned in different planes. Grooves may be formed in the second part of the frame, the grooves being substantially parallel to the first and second substrates. The grooves may be formed on both sides of the frame. The depth of the grooves s at least 50% of the thickness (x) of the frame.

In another aspect the invention proposes a display tile comprising a frame as described above.

BRIEF DESCRIPTION OF THE FIGURES DRAWINGS

FIGS. 9A to D illustrate a first and second substrate fastened to a frame in accordance with an embodiment of the present invention.

Figure 10:
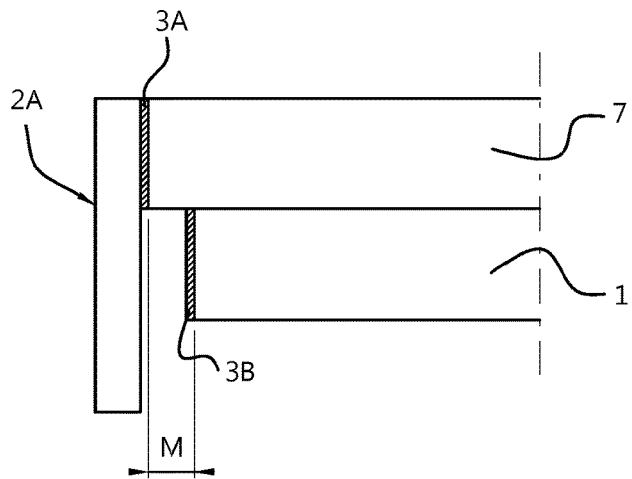

FIG. 10 illustrates the problem to fasten first and second substrate to a frame when the first and second substrates have different lateral dimensions and/or are misaligned.

Figure 11:
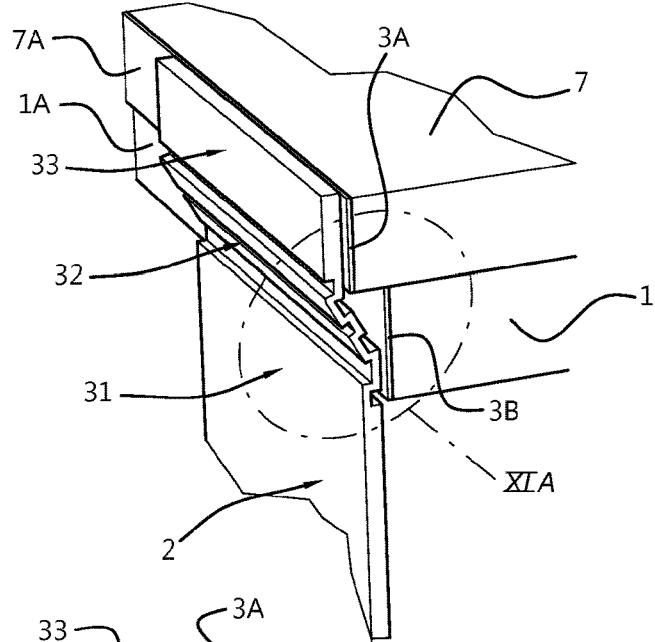
Figure 11A:
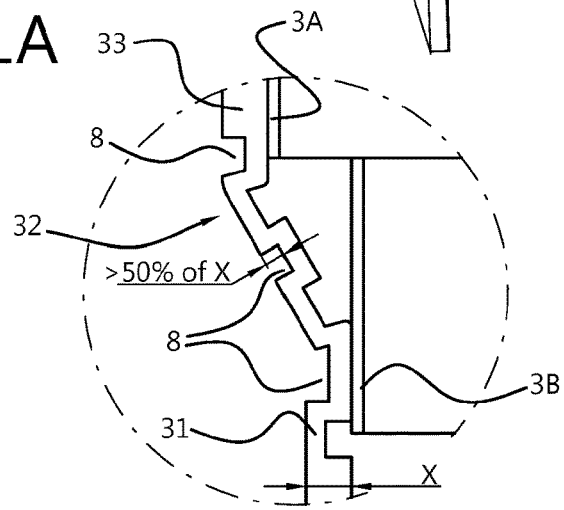

FIGS. 11 and 11A show an adaptation of the frame to allow deformation (i.e. compliance) of the frames and to allow the frame to be glued to first and second substrate even when at least one lateral side of one of the substrate is not coplanar with the corresponding lateral side of the other substrate in accordance with an embodiment of the present invention.

DETAILED DESCRIPTION OF THE INVENTION

The present invention will be described with respect to particular embodiments and with reference to certain drawings but the invention is not limited thereto but only by the claims.

Embodiments of the present relate to a design of a display tile T that has one, or some or all of the following advantages:
 keeps its form and flatness,
 has only negligible thermal expansion regardless of its environment (high humidity, temperature fluctuations . . . ) and/or
 will stay aligned with adjacent display tiles when used in a tiled display.

The invention is also related to tiled displays where the width of the seam will be as small or smaller than the spacing between adjacent pixels on a display tile.

To that end, with reference to FIGS. 2, 3, 5, 9 and 11 a stable transparent substrate 1 like for example glass is used. The substrate 1 is either part of a rear projection screen or a glass plate in a liquid crystal panel. The glass is for instance soda lime glass. Any suitable transparent material or other types of glass are possible. The coefficient of thermal expansion of the material used for the carrier substrate is advantageously lower than $9.5 \cdot 10^{-6}$ $K^{-1}$. The substrate 1 has a first side or entry face that is substantially planar. The entry face is the face or side of the substrate 1 through which the light projected by a projector or a backlight enters. The substrate 1 has a second side or exit face that is substantially planar. The exit face is the face or side of the substrate 1 through which the light exits towards a viewer. The first side and second side of the substrate 1 are substantially parallel. When a line or surface, in particular a plane, is said to be perpendicular to the substrate, it means that the line or surface is perpendicular to the first and second sides of the substrate 1.

Figure 1:
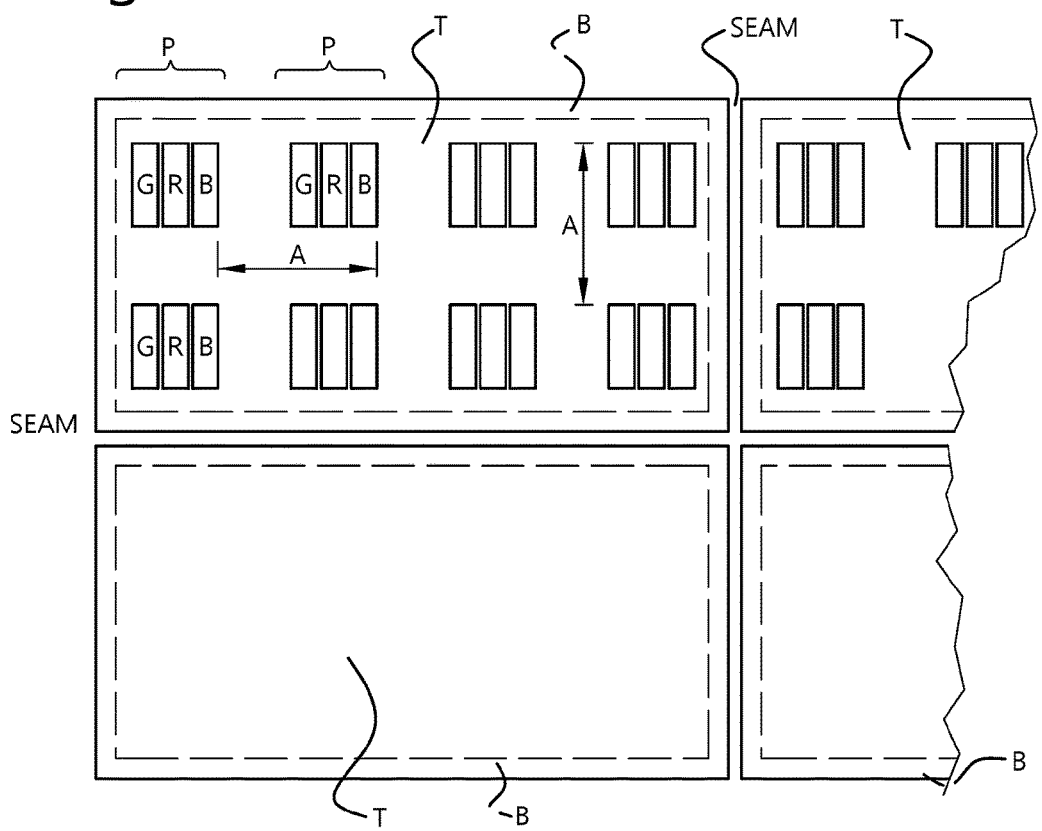
FIG. 1 shows a schematic representation of a tiled display.
Figure 2A:
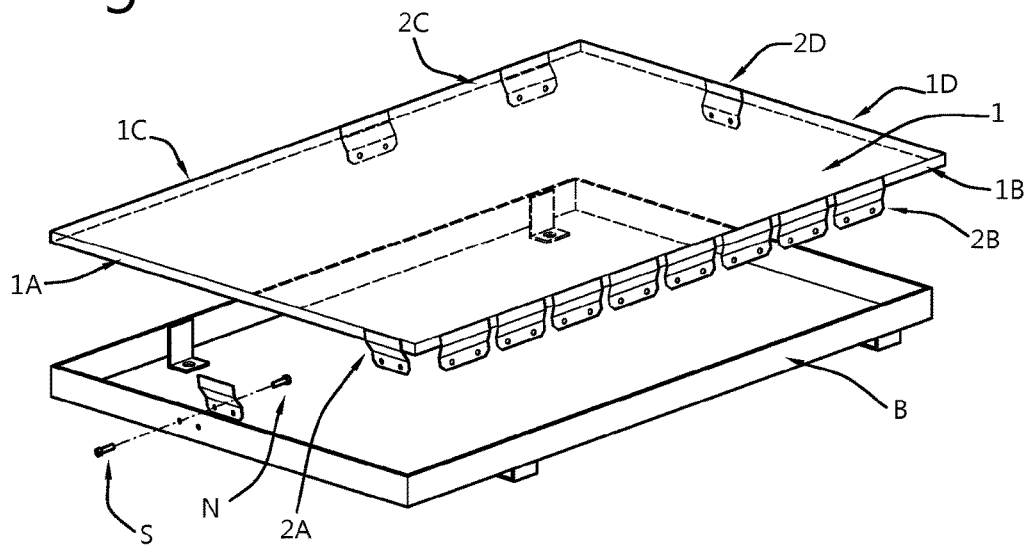
FIG. 2A shows an exploded view of a display tile, its frame and a backlight structure.

The substrate 1 is usually a parallelepiped with a first surface, a second surface parallel to the first surface and lateral sides 1A, 1B, 1C and 1D as shown in FIG. 2A.

A display (whether it is a rear projection display or an emissive display like a liquid crystal display or LCD), can be a fixed format display. The substrate 1 is associated with other layers. For instance the substrate 1 can support an optical element such as a Fresnel lens and/or a diffuser layer. The substrate 1 can also be part of an LCD panel. In that case, the substrate 1 is but one component of a liquid crystal panel: thin film transistors can be formed on the substrate 1; a the first glass substrate 1 and second glass substrate parallel to the first delimit a space to enclose a layer of liquid crystals, additional layers like e.g. colour filters can be formed on the second surface etc. . . . . In the description of the invention below, only the first substrate 1 will be explicitly mentioned. The display could also be a plasma display.

To avoid a non-display area along the perimeter of the substrate 1, the substrate is fastened to a frame 2 by mean of an adhesive film 3 distributed along the lateral sides 1A, 1B, 1C and 1D of the substrate as shown in FIGS. 3B, 3C, 9C, 9D, 10, 11. Avoiding a non-display area is useful both in e.g. a single panel LCD and a tiled display panel.

The frame 2 is advantageously made of metal. This allows reducing the thickness of the frame without compromising on the solidity of the assembly.

The frame can be e.g. an aluminium ribbon cut in a sheet with a thickness between 0.1 mm and 1 mm. For instance, the thickness of the frame is 0.2 mm.

An example of adhesive film 3 is given in the utility model DE202009015262U1 "Latent reaktive, hitzeaktivierbare Klebmasse and damit hergestellte Klebemittel" which is incorporated herein by reference. Heat activation of the heat activated adhesive film can be done e.g. by near infrared heating or hot air (as provided by e.g. a heat gun).

Heat activated adhesive films not being fluid like glue; it is easier to control the thickness of the adhesive film 3 that will contribute to the seam between adjacent tiles.

Heat activated adhesive films are also easy to apply and cause no risk of glue penetration between layers associated with the substrate 1 or glue spilling onto one the first and/or second side of the substrate 1. This is very important because glue penetration would cause visual artefacts.

Figure 2B:
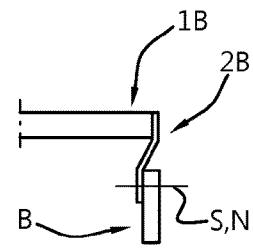
FIG. 2B shows an example of profile for a non-planar frame element.

The frame 2 is not necessarily of one piece. It can for instance be split into e.g. 2 or more frame strips (2A, 2B, 2C and 2D) as illustrated on FIG. 2A. As illustrated on FIG. 2A, several frame strips can be glued to a lateral side of the substrate 1 (e.g. 1B). The frame strips need not be planar as illustrated by FIG. 2B that shows an example of profile for a non-planar frame strip 2B. The frame strips (2A, 2B, 2C and 2D) are used as mechanical interface between the substrate 1 and a backlight structure B (in the case of e.g. a liquid crystal display) or a support structure B (in the case of e.g. a rear projection display). Fastening of the frame 2 to the structure B can be done e.g. by means of screws like screw S and nuts like nut N.

Figure 3A:
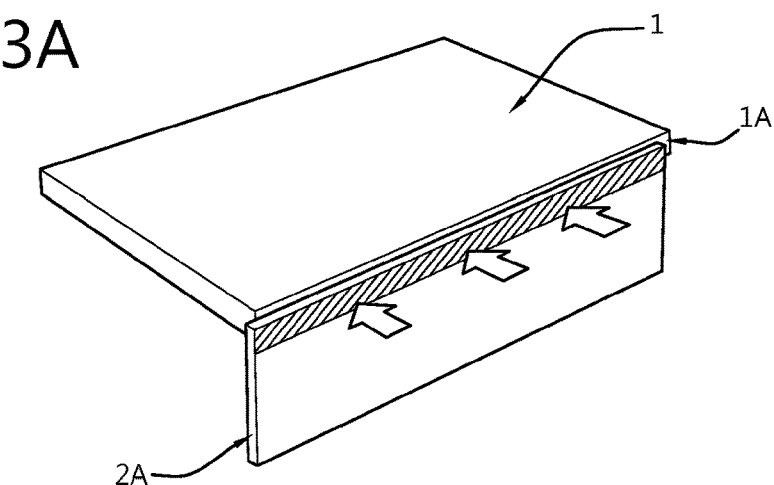
FIGS. 3A, 3B and 3C show how the substrate and the frame are fastened together by means of a heat activated adhesive tape in accordance with an embodiment of the present invention.
Figure 3B:
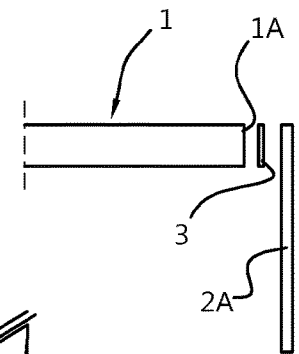
Figure 3C:
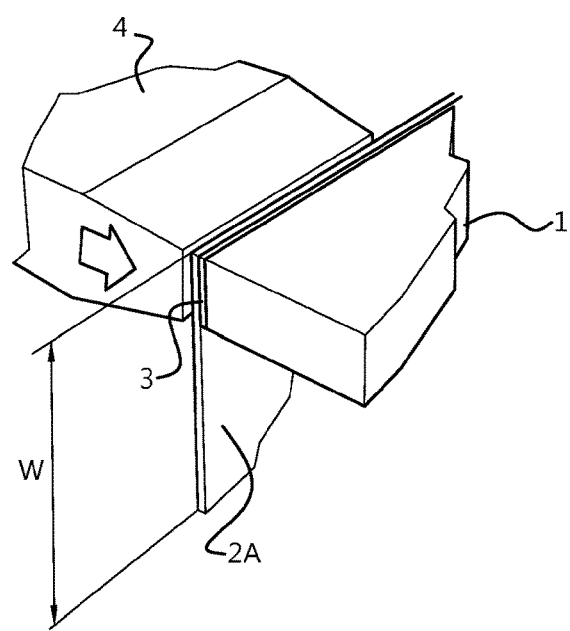

A strip, e.g. 2A, is pressed against the heat activated adhesive tape 3 applied to one of the lateral sides, e.g. 1A, of the substrate 1 as illustrated on FIGS. 3A and 3B. Heat and pressure are applied to the frame strip with help of e.g. a bonding head 4 as illustrated on FIG. 3C. The use of a bonding head allows application of heat and pressure in a well delimited region of the frame strip (the shaded area on FIG. 3A).

Figure 4A:
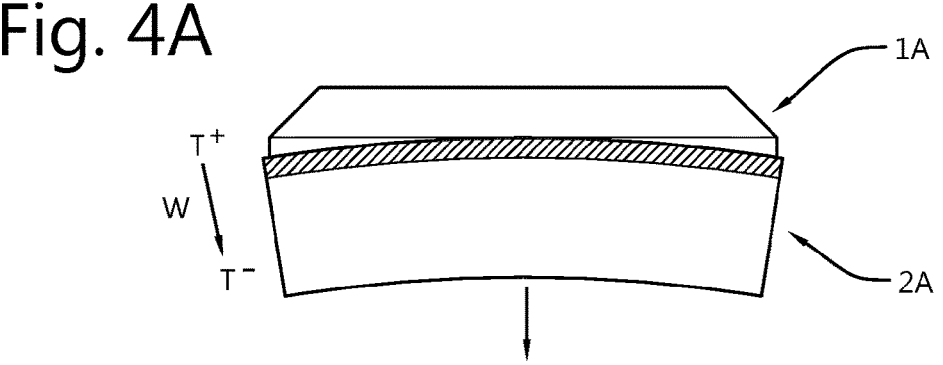
FIGS. 4A and 4B show the deformation of the frame and the substrate during and after heat activation of the adhesive tape of an embodiment of the present invention.

When heat is applied to activate the adhesive tape 3, the frame strip heats and expands. Heating and expansion will be highest right under the bonding head. Even if the frame strip is made of a metal like e.g. aluminum, the temperature will vary across the width W of the frame strip from a higher temperature T+ to a lower temperature T−. As a result, the frame strip will not expand uniformly as illustrated on FIG. 4A. At the same time, the dimensions of the glass substrate 1, and in particular the length of the lateral side (1A, 1B, 1C or 1D) being glued to the frame strip (2A, 2B, 2C or 2D), will change as well but to a lesser extent than the frame strip.

Figure 4B:
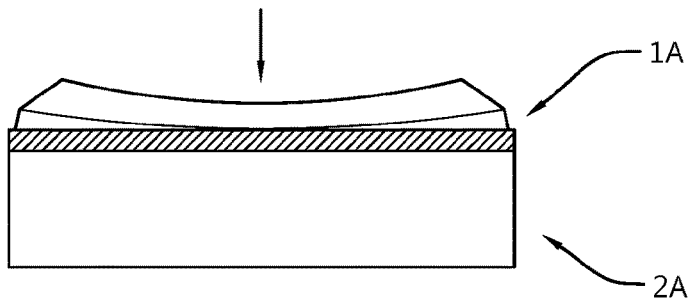

As it cools down, the frame strip 2A will return to its initial length, inducing deformations of the substrate as illustrated on FIG. 4B where the substrate 1 buckles under compressive stress by one or more of the frame strips. The impact of such deformations on the seam between adjacent tiles causes variations of the seam width along a seam and from seam to seam that will make the seam between tiles more perceptible to a viewer than would otherwise be the case. In some cases, the contraction can cause failure of the adhesive tape.

Figure 5:
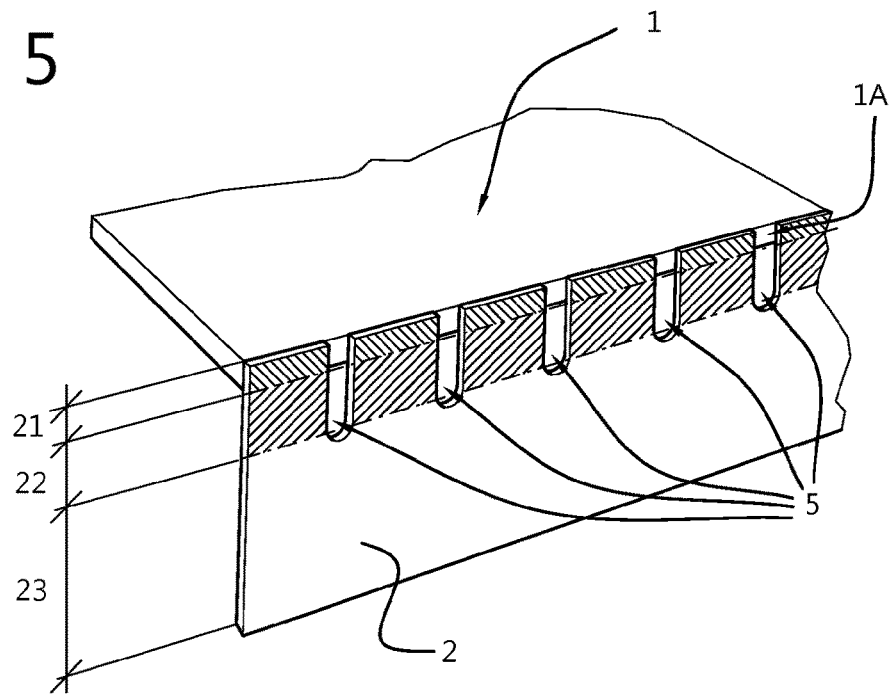
FIG. 5 shows a first adaptation of the frame to prevent deformation of the substrate caused by strain in the region of the frame that is glued to the substrate in accordance with an embodiment of the present invention.

To solve this problem, the shape of the metallic frame strip is modified as illustrated on FIG. 5 in accordance with one embodiment of the present invention.

The frame strip 2 is divided in three parts: a first part 21, a second part 22 and a third part 23. A first part 21 will be glued to a lateral side of the substrate 1.

A second part 22 acts as a strain relief structure between the first part 21 and the third part 23. The second part 22 is preferably more compliant than the other two parts, 21 and 23.

At least some strain relief is assured by one or more openings or slits 5 in the frame strip. An opening 5 extends from the edge of the frame strip and extends across the first and second part of the frame strip.

The opening 5 can be shaped as a rectangle but other geometries are possible. For instance, the corners of the opening can be rounded as illustrated on FIG. 5.

Figure 6:
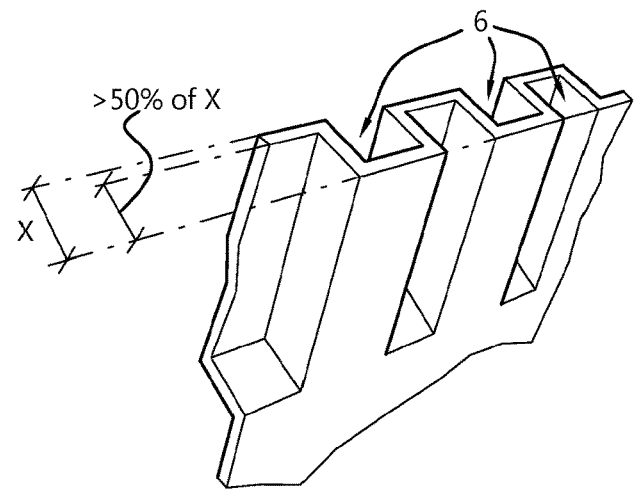
FIG. 6 shows a second adaptation of the frame in accordance with an embodiment of the present invention.
Figure 7A:
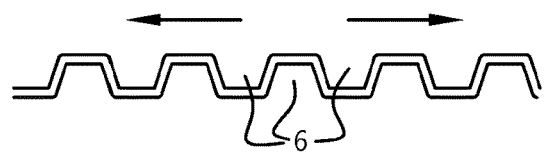
FIGS. 7A and 7B illustrate the deformations of the second part of the frame.
Figure 7B:
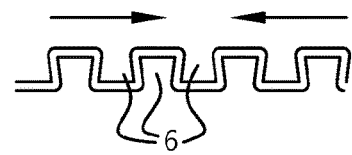

Strain relief can also be assured by grooves 6 etched or stamped in the first and/or second part of the frame strip as illustrated on FIG. 6.

The grooves 6 are formed, e.g. by etching on both sides of the frame strip 2 giving a corrugated aspect to the region where they are formed.

The depth of the grooves is ideally more than 50% of the thickness (x) of the frame strip.

The grooves 6 are preferably substantially perpendicular to the substrate 1. In other words, the angle made by a groove 6 and the substrate 1 is preferably 90.0 degrees of angle+/−0.1 degree of angle. Alternatively, the angle made by a groove 6 and the substrate 1 is preferably 90.0 degrees of angle+/−0.5 degree of angle. Alternatively, the angle made by a groove 6 and the substrate 1 is preferably 90.0 degrees of angle+/−1.0 degree of angle. Alternatively, the angle made by a groove 6 and the substrate 1 is preferably 90.0 degrees of angle+/−5.0 degree of angle. Alternatively, the angle made by a groove 6 and the substrate 1 is less than 90.0 degrees of angle but more than 45.0 degrees of angle.

Figure 8:
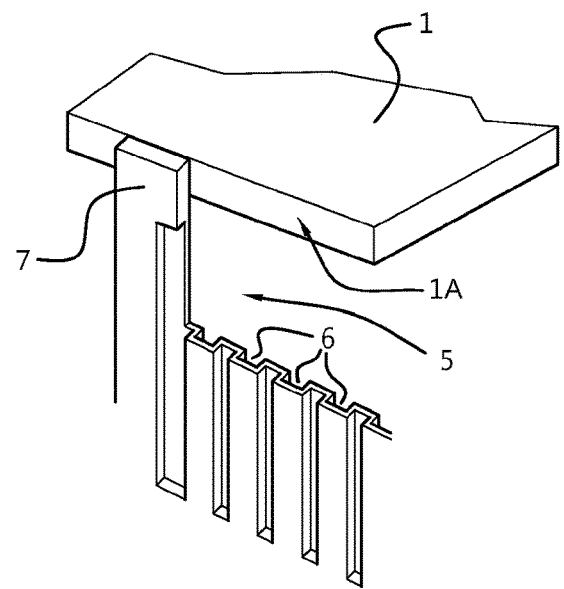
FIG. 8 illustrates how first and second adaptation of the frame can be combined in accordance with an embodiment of the present invention.

It is also possible to combine openings 5 and grooves 6 to further improve the isolation of the third part 23 of the frame strip from strain in the first part 21 of the frame strip. Openings 5 and grooves or corrugations 6 can be combined in different manners. An example of how openings 5 and grooves or corrugation 6 can be combined is illustrated on FIG. 8. In this example, the grooves 6 are etched right under the openings 5.

As mentioned earlier, the substrate 1 may be associated to other layers and/or substrates as is e.g. the case in a liquid crystal panel.

Figure 9A:
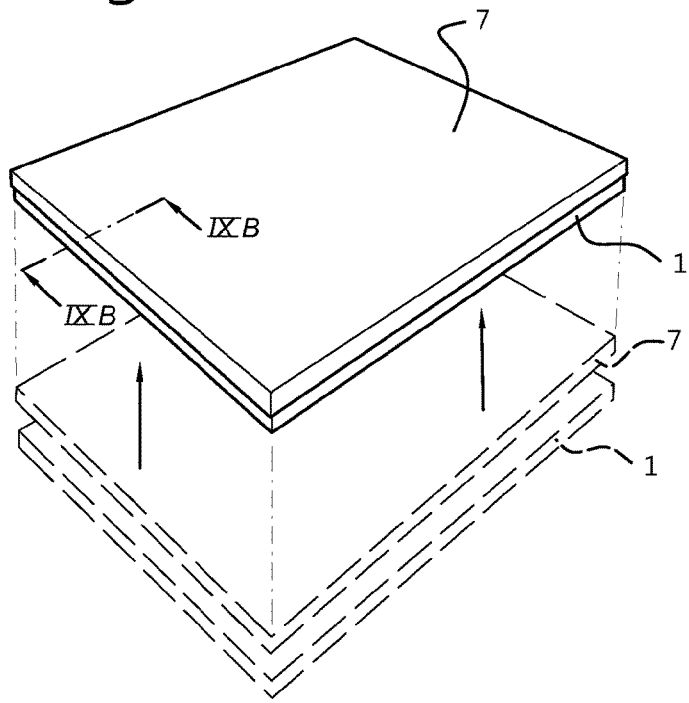
Figure 9B:
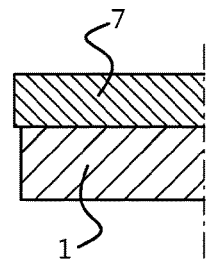
Figure 9C:
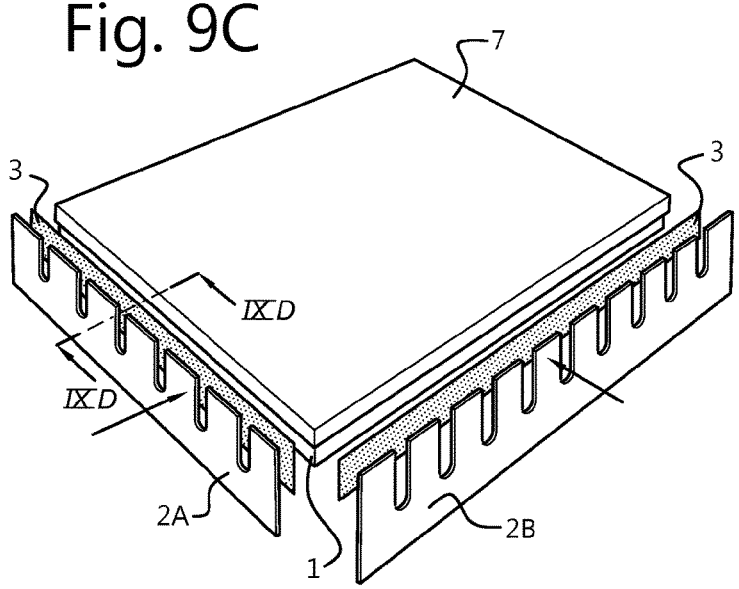
Figure 9D:
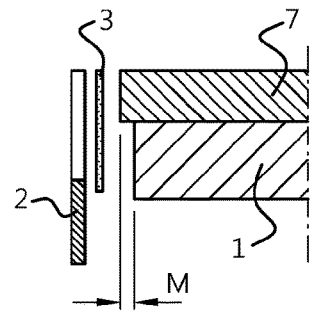

In that case, the different substrates and layer may have slightly different dimensions as illustrated on FIGS. 9A, B, C, e.g. FIG. 9D where substrate 1 is slightly smaller than substrate 7 resulting in a mismatch M between the lateral side of substrates 1 and 7. Alternatively, both substrates can have close to identical dimensions but they can be misaligned, resulting in their lateral sides not being coplanar.

When the dimensions of substrates 1 and 7 differ too much and/or when both substrates are misaligned, it can be difficult to glue them together to the frame 2 (the bond may be weaker than expected or even inexistent with one or both of the substrates). This is illustrated on FIG. 10 where a cross section of a frame strip 2A the heat activated layer 3 and substrates 1 and 7 are shown. As can be seen on FIG. 10, the mismatch M between the substrates lateral sides 1A and 7A makes bonding of the lateral sides 1A to the frame strip very difficult or impossible. Two adhesive tapes 3A and 3B can be used on the lateral sides 7A and 1A of substrates 7 and 1 respectively but this will not prevent that there will be no contact between the adhesive strip 3B and the frame element 2A.

A solution to that problem in accordance with an embodiment of the present invention is to increase the compliance (i.e. flexibility) of the frame element 2A in the region of the frame element that will correspond to the border between substrates 1 and 7. The compliance can, for instance, be increased by etching grooves 8 in the frame element as illustrated on FIG. 11, especially FIG. 11A. The depth of the grooves 8 is preferably more than 50% of the thickness of the frame element 2.

FIG. 11 shows frame strip 2, the heat activated adhesive layer 3A and substrates 1 and 7. A heat activated adhesive tape 3A and optionally 3B can be used on the lateral sides 7A and optionally sides 1A of substrates 7 and 1 respectively.

As shown in FIG. 11, frame 2 can be fastened to the first substrate 1 and the second substrate 7 by means of an adhesive tape 3A 3B, respectively. The frame 2 is divided into 3 parts: a first part 31 which can be optionally glued by means of a heat activated adhesive tape 3B to a lateral side of the first substrate 1, a third part 33 to be glued by means of the heat activated adhesive tape 3A to a lateral side of the second substrate 7 and a second part 32 positioned between the first 31 and third 33 part, the second part 32 having a higher compliance (i.e. better able to comply or adjust) than the first 31 and third 33 part thereby allowing the first 31 and third 33 part to be positioned in different planes.

The grooves 8 can be formed in the second part 32 of the frame 2, the grooves 8 being substantially parallel to the first 1 and second 7 substrates. The depth of the grooves 8 is preferably more than 50% of the thickness of the frame 2. The grooves 8 can be formed on both sides of the frame 2.

The frame 2 can be split into two or more frame elements or strips 31, 32, 33. A frame 2, e.g. 2A, 2B, 2C . . . that will accommodate both the thermal expansion during heat activation and the mismatch between the position of the lateral sides (e.g. 1A and 7A) of substrates 1 and 7 can be obtained by positioning the grooves 8 in the first part 31 of a frame 2, e.g. 2A, 2B, 2C . . . . The desired deformation of the frame 2 will be obtained with grooves 8 substantially parallel to the first and second substrate 1, 7 to which substrates the frame 2 is glued.

In other words, the angle made by a groove 8 and the first and second substrates 1 and 7 is preferably 0.0 degrees of angle+/−0.1 degree of angle. Alternatively, the angle made by a groove 8 and the first and second substrates 1 and 7 is preferably 0.0 degrees of angle+/−0.5 degree of angle. Alternatively, the angle made by a groove 8 and the first and second substrates 1 and 7 is preferably 0.0 degrees of angle+/−1.0 degree of angle. Alternatively, the angle made by a groove 8 and the first and second substrates 1 and 7 is preferably 0.0 degrees of angle+/−5.0 degree of angle. Alternatively, the angle made by a groove 8 and the first and second substrates 1 and 7 is larger than 0.0 degrees of angle but less than 45.0 degree of angle.

The invention claimed is:

1. A frame for a display tile, the frame being of one piece or being split into two or more frame elements or strips, the frame being made of a first material with a first coefficient of thermal expansion, the frame being adapted to be fastened to a substrate, wherein the substrate forms part of the display tile, the substrate being made of a second material with a second coefficient of thermal expansion; wherein the one piece frame or each frame element or strip is divided into three parts: a first part to be glued to a lateral side of the substrate, a third part to serve as fastening interface to a support structure or a backlight structure and a second part positioned between the first and third part to isolate the third part from strain in the first part.

2. The frame for a display tile according to claim 1, wherein at least one opening extends from an edge of the frame and extends across the first part and the second part of the frame.

3. The frame for a display tile according to claim 1, wherein grooves are formed in the first part and/or the second part of the frame and/or grooves are formed on both sides of the frame.

4. The frame for a display tile according to claim 3, wherein the depth of the grooves is at least 50% of the thickness of the frame.

5. The frame for a display tile according to claim 1, wherein the first part is glued by means of adhesive tape to the lateral side of the substrate.

6. A display tile and a frame according to claim 1.

7. A display comprising at least one display tile and frame according to claim 1.

8. A frame for a display tile, the frame being of one piece or being split into two or more frame elements or strips, the frame being adapted to be fastened to a first substrate and a second substrate, wherein the first substrate and the second substrate form part of the display tile; wherein the one piece frame or each frame element or strip is divided into 3 parts: a first part to be glued to a lateral side of the first substrate, a third part to be glued to a lateral side of the second substrate and a second part positioned between the first and third part, the second part having a higher compliance than the first and third part thereby allowing the first and third part to be positioned in different planes.

9. The frame for a display tile according to claim 8, wherein grooves are formed in the second part of the frame, the grooves being substantially parallel to the first and second substrates and/or grooves are formed on both sides of the frame.

10. The frame for a display tile according to claim 9, wherein the depth of the grooves is at least 50% of the thickness of the frame.

11. The frame for a display tile according to claim 8, wherein the first part is glued by means of adhesive tape to the lateral side of the substrate.

12. A display tile and a frame according to claim 8.

13. A method of fabricating a frame for a display tile, the frame being of one piece or being split into two or more frame elements or strips, the frame being made of a first material with a first coefficient of thermal expansion, the method comprising:

fastening the one piece frame or each frame element or strip to a substrate made of a second material with a second coefficient of thermal expansion, wherein the substrate forms part of the display tile;

fabricating the one piece frame or each frame element or strip in three parts:

gluing a first part to a lateral side of the substrate, fastening a third part to a support structure or a backlight and positioning a second part between the first and third part to isolate the third part from strain in the first part.

14. The method according to claim 13, further comprising the step of forming at least one opening which extends from an edge of the frame and extends across the first part and the second part of the frame.

15. The method according to claim 13, wherein grooves are formed in the first part and/or the second part of the frame and/or grooves are formed on both sides of the frame.

16. The method of claim 15, wherein the depth of the grooves is at least 50% of the thickness of the frame.

17. A method of fabricating a frame for a display tile, said frame being of one piece or being split into two or more frame elements or strips, the method comprising:

fastening the one piece frame or each frame element or strip to a first substrate and a second substrate forming part of the display tile;

fabricating the one piece frame or each frame element or strip in 3 parts:

gluing a first part to a lateral side of the first substrate, gluing a third part to a lateral side of the second substrate, and positioning a second part between the first and third part, the second part having a higher compliance than the first and third part thereby allowing the first and third part to be positioned in different planes.

18. The method according to claim 17, further comprising the step of forming at least one opening which extends from an edge of the frame and extends across the first part and the second part of the frame.

19. The method according to claim 17, wherein grooves are formed in the first part and/or the second part of the frame and/or grooves are formed on both sides of the frame.

20. The method of claim 19, wherein the depth of the grooves is at least 50% of the thickness of the frame.

* * * * *